US011952054B2

(12) United States Patent
Asao et al.

(10) Patent No.: US 11,952,054 B2
(45) Date of Patent: Apr. 9, 2024

(54) ELECTRIC POWER STEERING APPARATUS (71) Applicant: Mitsubishi Electric Corporation, Tokyo (JP)

(72) Inventors: Yoshihito Asao, Tokyo (JP); Yoshihiko Onishi, Tokyo (JP); Toyoaki Udo, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 911 days.

(21) Appl. No.: 16/969,253

(22) PCT Filed: May 22, 2018

(86) PCT No.: PCT/JP2018/019584
§ 371 (c)(1),
(2) Date: Aug. 12, 2020

(87) PCT Pub. No.: WO2019/224898
PCT Pub. Date: Nov. 28, 2019

(65) Prior Publication Data
US 2021/0001918 A1 Jan. 7, 2021

(51) Int. Cl.
*B62D 5/04* (2006.01)

(52) U.S. Cl.
CPC ......... *B62D 5/0406* (2013.01); *B62D 5/0424* (2013.01)

(58) Field of Classification Search
CPC ...... B62D 5/04; B62D 5/0403; B62D 5/0406; B62D 5/0421; B62D 5/0424; H02K 5/12
See application file for complete search history.

(56) References Cited

U.S. PATENT DOCUMENTS

| 2001/0021103 | A1* | 9/2001 | Takagi | H05K 7/14322 |
| | | | | 361/752 |
| 2003/0173920 | A1* | 9/2003 | Tominaga | B62D 5/0406 |
| | | | | 318/432 |
| 2005/0115727 | A1 | 6/2005 | Sakata | |
| 2017/0282965 | A1 | 10/2017 | Sekikawa | |
| 2019/0199176 | A1 | 6/2019 | Kanazawa et al. | |

FOREIGN PATENT DOCUMENTS

| CN | 107416013 | A | 12/2017 | |
| EP | 1527956 | B1 | 8/2006 | |
| EP | 2371673 | A2 * | 10/2011 | ........... B62D 5/0406 |
| EP | 3225509 | A1 | 10/2017 | |
| JP | 2002-079950 | A | 3/2002 | |
| JP | 2005-132165 | A | 5/2005 | |

(Continued)

OTHER PUBLICATIONS

International Search Report for PCT/JP2018/019584 dated Aug. 28, 2018 [PCT/ISA/210].

(Continued)

*Primary Examiner* — Tulsidas C Patel
*Assistant Examiner* — Joshua M Rodriguez
(74) *Attorney, Agent, or Firm* — Sughrue Mion, PLLC; Richard C. Turner (57) ABSTRACT

There is provided an electric power steering apparatus in which at least one of a motor housing and a control unit has a respiratory apparatus that performs a respiratory action, based on an inner pressure change in at least one of the motor housing and the control unit.

20 Claims, 5 Drawing Sheets

(56) References Cited

FOREIGN PATENT DOCUMENTS

| JP | 2009-184492 A | 8/2009 |
|---|---|---|
| JP | 2017-177996 A | 10/2017 |
| WO | 2018042989 A1 | 3/2018 |

OTHER PUBLICATIONS

Notification of Reasons for Refusal dated Jul. 20, 2021 from the Japanese Patent Office in JP Application No. 2020-520892.
Communication dated Apr. 14, 2022 from The State Intellectual Property Office of People's Republic of China in Application No. 201880093399.9.
Communication dated Mar. 30, 2021, from the India Patent Office in application No. 202027039773.
Communication dated Apr. 29, 2021, from the European Patent Office in application No. 18919546.4.

* cited by examiner

ELECTRIC POWER STEERING APPARATUS

CROSS REFERENCE TO RELATED APPLICATIONS

This application is a National Stage of International Application No. PCT/JP2018/019584 filed May 22, 2018.

TECHNICAL FIELD

The present disclosure relates to an electric power steering apparatus in which a motor and a control unit are integrated with each other.

BACKGROUND ART

As is well known, an electric power steering apparatus is configured in such a way that auxiliary torque corresponding to steering torque exerted on a steering shaft by a driver of a vehicle is generated by a motor so that steering by the driver is assisted; however, in an electric power steering apparatus in which a motor and a control unit for controlling the motor are integrated with each other, in consideration of a case where the electric power steering apparatus is installed in the vicinity of a rack axle outside the vehicle interior, there are required not only waterproofing measures for the motor itself and the control unit itself but also waterproofing measures for the coupling portion between the motor and the control unit. To date, as waterproofing measures for the coupling portion between the motor and the control unit, there have been taken measures in which, for example, a seal is applied to or an O-ring is mounted on the coupling portion.

In an electric power steering apparatus disclosed in Patent Document 1, a motor and a control unit are integrated with each other and, as waterproofing measures for the space between the power steering apparatus and a gear housing that are provided at the vehicle side, there is adopted a structure in which a ring-shaped sealing member passing through the outside of an electric connection portion of the motor is mounted between the motor and a motor mounting portion of the gear housing. The conventional electric power steering apparatus disclosed in Patent Document 1 make it possible to secure the waterproof property and the dust resistance in the connection portion between the motor and the gear housing and to secure the waterproof property also in the electric connection portion of the motor.

Meanwhile, in the case of an electric power steering apparatus having a watertight structure in which a motor and a control unit are completely waterproof, when due to heat generation in the motor or the control unit, the temperature of air inside the electric power steering apparatus rises, the pressure inside the electric power steering apparatus may become higher than that of the outer air; in contrast, when for example, due to stoppage of the electric power steering apparatus, the temperature of air inside the electric power steering apparatus falls, the pressure inside the electric power steering apparatus may become lower than that of the outer air, i.e., a so-called negative pressure may occur. When the pressure change in the inside of the electric power steering apparatus is repeated, the waterproofing member of the electric power steering apparatus is deteriorated; therefore, there exists a probability that due to a pressure difference between the inside of the electric power steering apparatus and the outside thereof, water intrudes into the inside of the electric power steering apparatus.

Patent Document 2 discloses an electric power steering apparatus having a completely waterproof and watertight structure; it is proposed that in order to prevent a pressure change in air inside the electric power steering apparatus from deteriorating a waterproofing member, there is provided a respiratory hole for making the inside and the outside of the electric power steering apparatus communicate with each other, and a filter is inserted into the respiratory hole. The conventional electric power steering apparatus disclosed in Patent Document 2 make it possible that even when a self-heating member causes the temperature inside the electric power steering apparatus to rise, the air inlet reduces or relaxes the pressure difference between the inside and the outside of the electric power steering apparatus so that water is prevented from intruding into the inside of the electric power steering apparatus.

Each of the conventional electric power steering apparatus disclosed in Patent Document 1 and Patent Document 2 is configured in such away that as described above, a predetermined waterproof property can be secured; however, when being installed in the vicinity of a rack axle for turning tires of the vehicle, the electric power steering apparatus is exposed to water and dust and may be submerged in the water, in some cases; thus, it is required to take waterproofing measures having a considerable durability. Thus, it is required to secure the waterproof property of the electric power steering apparatus itself in which a motor and a control unit are integrated with each other and to secure the waterproof property of the mounting portion between the electric power steering apparatus and the vehicle.

PRIOR ART REFERENCE

Patent Literature

[Patent Document 1] Japanese Patent Application Laid-Open No. 2009-184492
[Patent Document 2] Japanese Patent Application Laid-Open No. 2005-132165

DISCLOSURE OF THE INVENTION

Problems to be Solved by the Invention

As described above, the conventional electric power steering apparatus disclosed in Patent Document 1 is configured in such a way that by use of a so-called O-ring, as a ring-shaped sealing member, the waterproof property of the space between the motor and the motor-mounting face of the gear housing is secured; however, the output axle of the motor is pivotably supported by use of a bearing whose waterproof property is not secured. Accordingly, by the intermediary of the bearing, a respiratory action is performed between the inside of the electric power steering apparatus and a ventilation path in the outer circumferential surface thereof.

However, because the foregoing ventilation path communicates with the outside by way of the inside of the gear housing provided at the vehicle side and the circumferential surface of the rack axle, a respiratory action, although slightly, is taken through the gear housing; thus, sufficient waterproofing measures have not been taken. Accordingly, because in some cases, water intrudes into the inside of the gear housing, there has been a problem that when the foregoing sealing member is deteriorated or broken, the waterproof property of the electric power steering apparatus cannot be secured.

The conventional electric power steering apparatus disclosed in Patent Document 2 has a respiratory hole for performing a respiratory action; a filter is inserted in the respiratory hole. In general, because having water-repellency, a filter is impervious to water but allows air to pass therethrough. Accordingly, the filter inserted into the air inlet can exert a limited waterproof property on sprinkled water like rain; however, there has been a problem that for example, when the pressure difference between the inside and the outside of the electric power steering apparatus, which is caused by the temperature difference therebetween, becomes large, no sufficient waterproof performance can be secured.

The present disclosure has been implemented in order to solve the foregoing problems in conventional electric power steering apparatuses; the objective thereof is to provide an electric power steering apparatus that secures a sufficient waterproof property and in which a motor and a control unit are integrated with each other.

Means for Solving the Problems

An electric power steering apparatus disclosed in the present application includes
a motor for generating auxiliary torque corresponding to steering torque exerted by a driver of a vehicle and
a control unit for controlling the motor; the integrated electric power steering apparatus is characterized
in that the motor and the control unit are integrated with each other and the motor is mounted in the vehicle through the intermediary of a gear unit,
in that the motor has a motor housing in which motor constituent members are contained, one axis-direction end portion of which is sealed, and the other axis-direction end portion of which is opened,
in that the control unit has a control unit case in which control apparatus constituent members are contained, one axis-direction end portion of which is opened, and the other axis-direction end portion of which is sealed,
in that the other axis-direction end portion of the motor housing and the one axis-direction end portion of the control unit case are coupled with each other while maintaining a waterproofing function,
in that the one axis-direction end portion of the motor housing and the gear unit are coupled with each other while maintaining a waterproofing function, and
in that at least one of the motor housing and the control unit has a respiratory apparatus that performs a respiratory action, based on an inner pressure change in at least one of the motor housing and the control unit.

Advantage of the Invention

In the electric power steering apparatus disclosed in the present application, the motor has a motor housing in which motor constituent members are contained, one axis-direction end portion of which is sealed, and the other axis-direction end portion of which is opened; the control unit has a control unit case in which control apparatus constituent members are contained, one axis-direction end portion of which is opened, and the other axis-direction end portion of which is sealed; the other axis-direction end portion of the motor housing and the one axis direction end portion of the control unit case are coupled with each other while maintaining a waterproofing function; the one axis-direction end portion of the motor housing and the gear unit are coupled with each other while maintaining a waterproofing function; at least one of the motor housing and the control unit has a respiratory apparatus that performs a respiratory action, based on an inner pressure change in at least one of the motor housing and the control unit. As a result, it is made possible to maintain a respiratory action and to suppress the waterproof performance from being deteriorated.

BEST MODE FOR CARRYING OUT THE INVENTION

Embodiment 1

Figure 1:
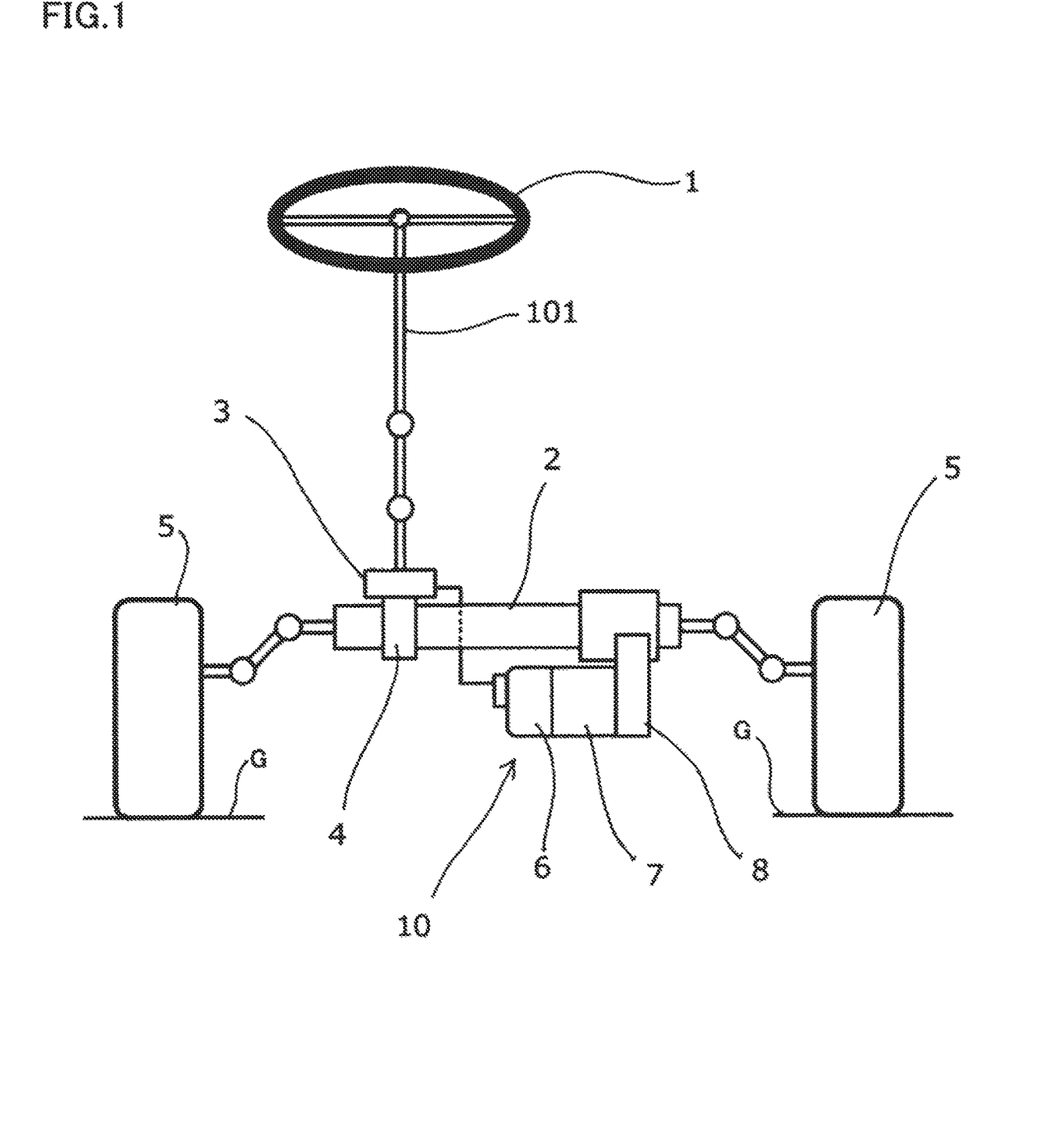
FIG. 1 is a configuration view illustrating a steering system of a vehicle in which an electric power steering apparatus according to Embodiment 1 is mounted.

Hereinafter, an electric power steering apparatus according to Embodiment 1 will be explained in detail with reference to the drawings. FIG. 1 is a configuration view illustrating a steering system of a vehicle in which an electric power steering apparatus according to Embodiment 1 is mounted; in FIG. 1, an electric power steering apparatus 10 according to Embodiment 1 has a motor 7 and a control unit 6 for controlling the motor 7. The motor 7 and the control unit 6 are arranged in the axial direction on one and the same axial line and are integrated with each other in such a way that the respective axis-direction ends facing each other are coupled with each other. The electric power steering apparatus 10 is mounted to a gear unit 8 in such a way that the direction in which the center axis extends is in parallel with the direction in which the center axis of the rack axle unit 2 extends.

A torque sensor 3, provided in a steering column containing a steering shaft 101, detects steering torque exerted by a driver of a vehicle on the steering shaft 101 through the intermediary of a steering wheel 1, and then inputs the steering torque to the control unit 6 of the electric power steering apparatus 10. Based on the steering torque inputted from the torque sensor 3, the control unit 6 controls the motor 7 so as to make the motor 7 generate auxiliary torque corresponding to the steering torque exerted by the driver.

The gear unit 8 mounted in the rack axle unit 2 has a gear mechanism engaged with a rack axle contained in the rack axle unit 2 of the vehicle and with the output axle 11 of the motor 7, and drives the rack axle unit 2 in the axial direction thereof, based on the auxiliary torque outputted through the output axe of the motor 7, so as to turn steering of vehicle wheels 5. The steering shaft 101 is coupled with the rack axle unit 2 through the intermediary of the pinion gear 4.

As illustrated in FIG. 1, the torque sensor 3 is mounted at a position farther from the ground G with respect to the rack axle unit 2; the electric power steering apparatus 10 is mounted at a position closer to the ground G with respect to the rack axle unit 2. Because as discussed above, the electric power steering apparatus is mounted at a position closer to the ground G with respect to the rack axle unit 2, it is indispensable that in comparison with a case where the electric power steering apparatus is mounted above the rack axle unit 2, a waterproof property conforming to a stricter specification is secured.

Figure 2:
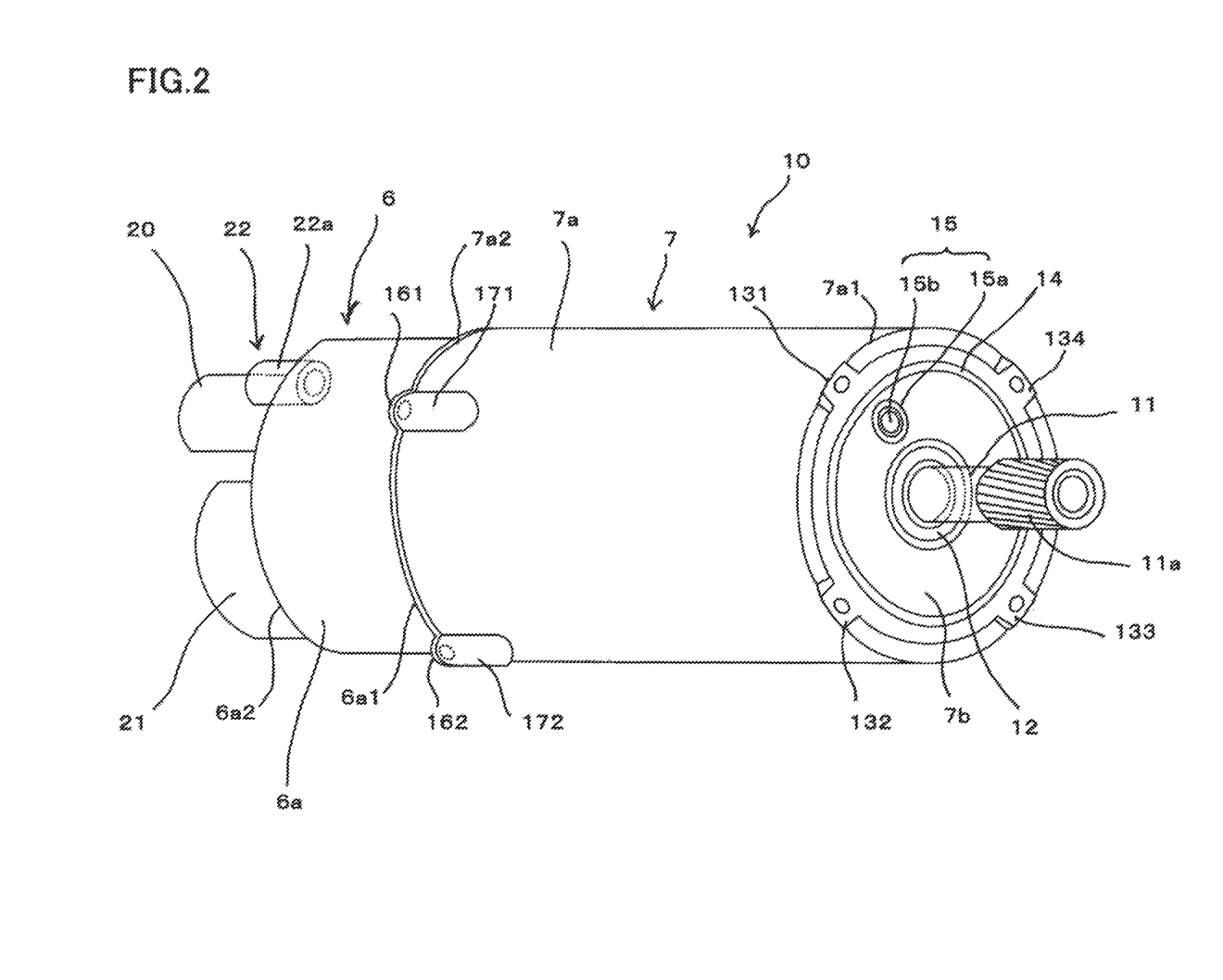
FIG. 2 is a perspective view of the electric power steering apparatus according to Embodiment 1.
Figure 3A:
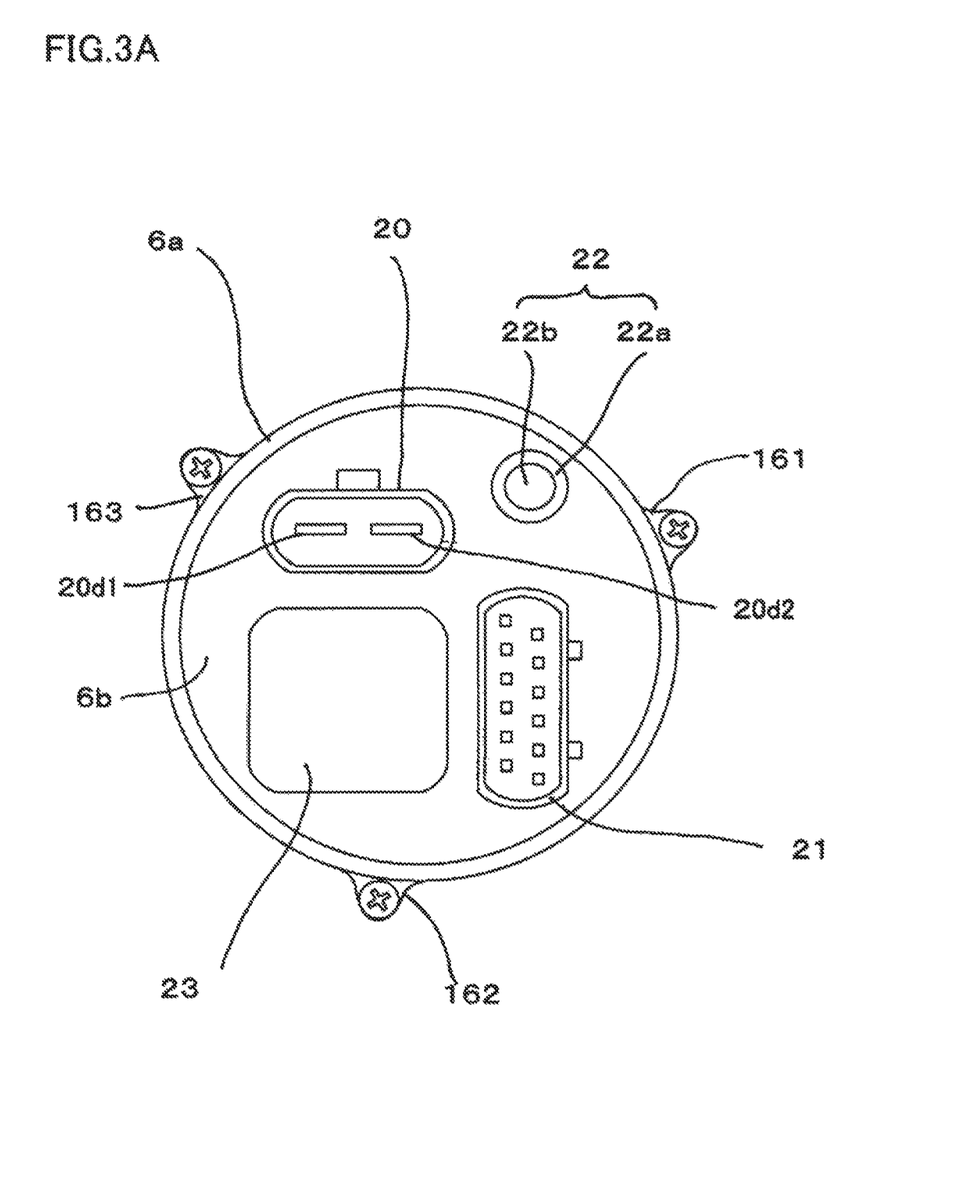
FIG. 3A is a plan view, at a control unit side, of the electric power steering apparatus according to Embodiment 1.

Next, the electric power steering apparatus according to Embodiment 1 will be explained further in detail. FIG. 2 is a perspective view of the electric power steering apparatus according to Embodiment 1; FIG. 3A is a plan view, at the control unit side, of the electric power steering apparatus according to Embodiment 1; FIG. 38 is a partial side view, at the control unit side, of the electric power steering apparatus according to Embodiment 1. In each of FIGS. 2, 3A, and 3B, the motor 7 has a cylindrical tubular motor housing 7a; motor constituent members such as stator windings and a rotor are incorporated in the motor housing 7a.

Figure 3B:
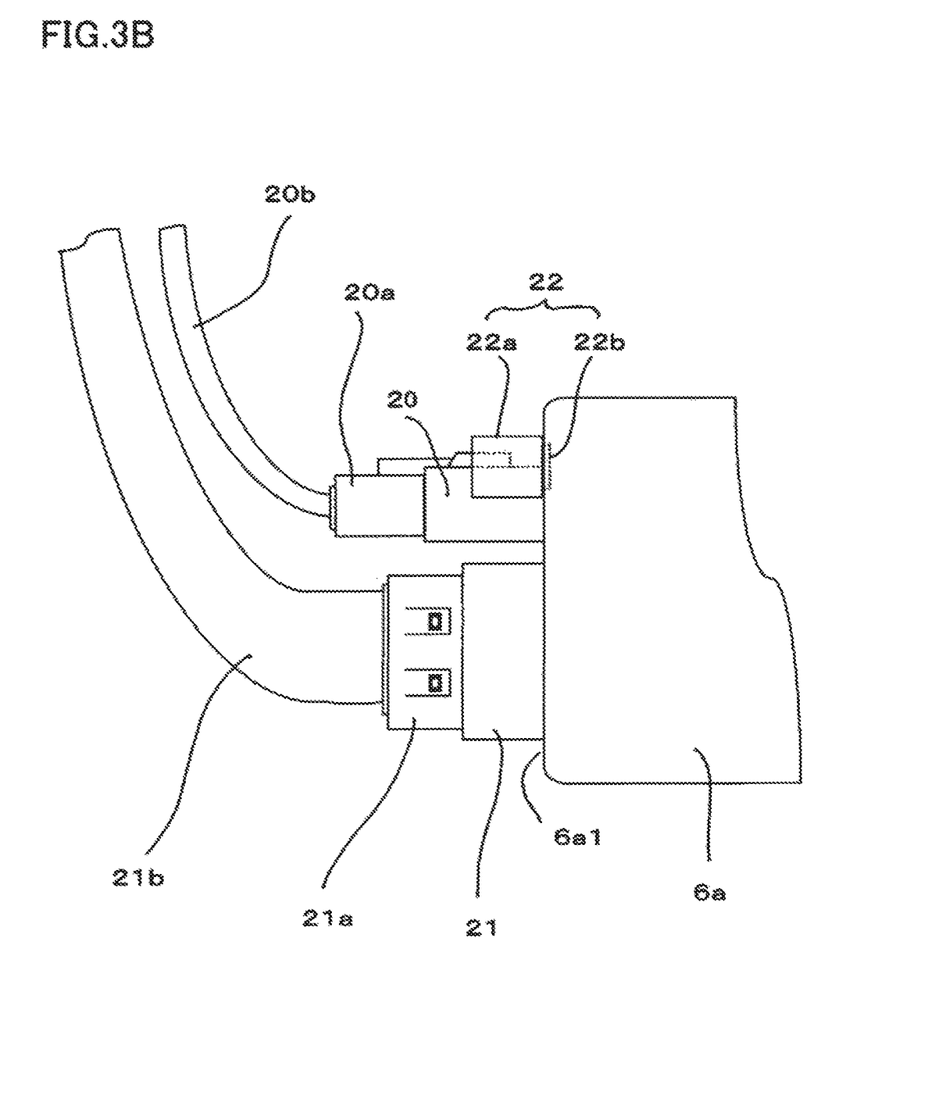
FIG. 3B is a partial side view, at the control unit side, of the electric power steering apparatus according to Embodiment 1.

The motor housing 7a is formed of metal, for example, aluminum, and is provided with a housing wall portion 7b for sealing one axial-direction end portion 7a1. The other axial-direction end portion 7a2 of the motor housing 7a is opened and coupled with one axial-direction end portion 6a1 of an after-mentioned control unit case 6a in the control unit 6. An output axle 11 of the motor 7 penetrates the central portion of the housing wall portion 7b in the motor housing 7a, through the intermediary of the bearing 12 and extends in the axial direction. An output-axle gear 11a formed in the axis-direction end portion of the output axle 11 is engaged with the foregoing gear mechanism in the gear unit 8. With regard to the motor housing 7a, because as described above, the one axial-direction end portion 7a1 is formed to be bottomed due to the housing wall portion 7b, water intrusion into the motor 7 through the housing wall portion 7b, as a side of the motor 7, is completely blocked, except for the bearing 12. The bearing 12 may be either a bearing having a non-waterproof structure or a bearing having a waterproof structure.

The motor housing 7a has four motor fixing portions 131, 132, 133, and 134 formed in such a way as to be spaced evenly apart from one another in the peripheral portion of the one axial-direction end portion 7a1 thereof. A ring-shaped U-shaped groove 114 in the surface of the housing wall portion 7b is formed at the inner diameter side with respect to the motor fixing portions 131, 132, 133, and 134 and at the outer diameter side with respect to the bearing 12. A ring-shaped O-ring (unillustrated) is inserted into the U-shaped groove 14. In addition, the number of the motor fixing portions is limited to 4; it goes without saying that the number thereof may be 3 or any of other numbers.

The foregoing motor fixing portions 131, 132, 133, and 134 are screwed to the motor mounting portion (unillustrated) of the gear unit 8, so that the electric power steering device 10 is coupled with the gear unit 8. In this situation, because the O-ring inserted into the U-shaped groove 14 in the housing wall portion 7b of the electric power steering device 10 is pressed against the surface of the motor mounting portion of the gear unit 8, the waterproof property in the coupling portion between the electric power steering device 10 and the gear unit 8 is secured.

A first respiratory apparatus 15, as a motor-side respiratory apparatus, is provided in the housing wall portion 7b in such a way as to be between the output axle 11 and the motor fixing portions 131, 132, 133, and 134. The first respiratory apparatus 15 includes a penetration hole portion 15a formed in the housing wall portion 7b and a filter 15b that has a water repellency and covers the opening portion of the penetration hole portion 15a. The first respiratory apparatus 15 is provided in the space between the bearing 12 and the U-shaped groove 14 in which the O-ring is mounted; however, it is desirable that within the foregoing space, the first respiratory apparatus 15 is disposed at an uppermost position in the radial direction of the housing wall portion 7b. As described above, the first respiratory apparatus 15 is disposed at a position surrounded by the bearing 12 and the O-ring for preventing water from intruding into the electric power steering device 10. The first respiratory apparatus 15 makes the electric power steering device 10 secure a respiratory function of allowing air but not allowing water to pass therethrough, by means of the filter 15b. In addition, the first respiratory apparatus 15 may be provided at an arbitrary position in the outer circumferential surface of the motor housing 7a, for example, in the vicinity of the vertex portion of the outer circumferential surface of the motor housing 7a.

The respiratory function of a bearing having a non-waterproof structure is higher than that of a bearing having a waterproof structure; however, the respiratory function of the first respiratory apparatus 15 is set to be higher than that of a bearing having a non-waterproof structure. That is to say, the gap of a bearing having a non-waterproof structure is narrower than the penetration hole portion 15a, of the first respiratory apparatus 15, that has the filter 15b; thus, even when as the bearing 12, a bearing having a non-waterproof structure is utilized, the respiratory function of the first respiratory apparatus 15 is higher than that of the bearing 12.

Meanwhile, the control unit 6 has a cylindrical tubular control unit case 6a formed of, for example, an insulating resin; a control apparatus constituent member such as a circuit network for controlling the motor 7 is contained in the control unit case 6a. The one axial-direction end face 6a1 of the control unit case 6a is opened, and the other axial-direction end portion 6a2 thereof is sealed with the case wall portion 6b. The dimension of the outer diameter of the control unit case 6a is formed to be a value that is the same as the dimension of the outer diameter of the motor housing 7a or a value that is extremely close thereto and is determined as being substantially equal thereto; however, the dimension of the outer diameter of the control unit case 6a may be formed to a value other than the foregoing values.

The control unit case 6a has three control unit fixing portions 161, 162, and 163 formed in such a way as to be spaced evenly apart from one another in the peripheral portion of the one axial-direction end face 6a1 thereof. The control unit fixing portions 161, 162, and 163 are screwed to three control-unit-fixing protrusion portions 171, 172, and another (in FIG. 2, only two thereof are illustrated) provided in the other axial-direction end portion 7a2, so that the control unit 6 is coupled with the motor 7. In this situation, a waterproof packing is inserted into or a waterproof compound is applied to the space between the axis-direction end face of the one axial-direction end portion 6a1 of the control unit case 6a and the axis-direction end face of the other axial-direction end portion 7a2 of the motor housing 7a, so that the waterproof property of the coupling portion between the control unit 6 and the motor 7 is secured. In addition, each of the number of the control unit fixing portions and the number of the fixing protrusion portions is not limited to 3; it goes without saying that the number thereof may be any of other numbers.

In the case wall portion 6b, a power source connector 20, a signal connector 21, an electric component containing portion 23, and a second respiratory apparatus 22 are formed integrally with the control unit case 6a. A vehicle-side power source connector 20a connected with a power source harness 20b is connected with the power source connector 20. A vehicle-side signal connecter 21a connected with a signal harness 21b for transmitting signals or the like from the torque sensor 3 is connected with the signal connector 21. Large electric components such as a noise filter and a capacitor are contained in the electric component containing portion 23. The power source connector 20, the vehicle-side power source connector 20a, the signal connector 21, and the vehicle-side signal connecter 21a are formed comforting to respective waterproof specifications.

FIG. 3B illustrates the state where the vehicle-side power source connector 20a connected with the power source harness 20b is connected with the power source connector 20 and where the vehicle-side signal connecter 21a connected with the signal harness 21b is connected with the signal connector 21; FIG. 3A illustrates the state where the vehicle-side power source connector 20a is not connected with the power source connector 20 and where the vehicle-side signal connecter 21a is not connected with the signal connector 21.

The power source connector 20 has two terminals, i.e., a positive-side power source connection terminal 20d1 and a negative-side power source connection terminal 20d2; the respective cross-sectional areas of these terminals are made large so that a large current for driving the motor 7 can be supplied. A large number of relatively small signal connection terminals 21d are arranged in the signal connector 21 so that in addition to information from the torque sensor 3 and the like, vehicle-side information such as a vehicle speed is inputted therethrough and a transmission signal from the control unit 6 is outputted therethrough. As illustrated in FIG. 1, the electric power steering apparatus 10 is mounted at a lowest position of the vehicle, and a vehicle battery (unillustrated) a vehicle speed sensor (unillustrated), and the like are provided at positions upper than the position where the electric power steering apparatus 10 is provided; therefore, all of the power source harness 20b and the signal harness 21b extend toward the upper side of the vehicle.

The second respiratory apparatus 22, as a control-unit-side respiratory apparatus, is provided in the vicinity of the power source connector 20 and the signal connector 21 in the case wall portion 6b of the control unit case 6a. The second respiratory apparatus 22 has a hollow protrusion portion 22a and a filter 22b having a water-repellency. The hollow protrusion portion 22a protrudes in the axial direction of the control unit 6 from the axis-direction endface portion of the case wail portion 6b and makes the respective insides of the control unit case 6a and the motor housing 7a communicate with the outside of the electric power steering apparatus 10. The filter 22b is mounted in such a way as to cover the root portion of the hollow protrusion portion 22a, i.e., the opening portion that opens toward the inside of the control unit case 6a.

When the motor 7 is driven, the electronic components and large electric components such as the noise filter and the capacitor included in the circuit network and the like contained in the control unit 6 generate heat. When being driven, the motor 7 itself also generates heat. Accordingly, a heat radiation member such as a heat sink is contained in the control unit case 6a; the heat generated by the foregoing components is transferred also to the motor constituent members included in the motor 7 through the heat sink or in a direct manner.

At a vehicle-driving time when the electric power steering apparatus 10 is driven, air in the electric power steering apparatus 10 expands due to the foregoing heat generation; in contrast, at a vehicle-drive-stoppage time when the electric power steering apparatus 10 is stopped, the temperature of the electric power steering apparatus 10 decreased and hence the air therein contracts; thus, the pressure inside the electric power steering apparatus 10 becomes a negative pressure. As a result, a respiratory action occurs in the electric power steering apparatus 10. Moreover, in the case where the electric power steering apparatus 10 is mounted at the lowest position of the vehicle, there exists a probability that for example, when the vehicle travels in a road puddle, the whole electric power steering apparatus 10 is submerged in the water.

Because communicating with the respective insides of the control unit case 6a and the motor housing 7a, the second respiratory apparatus 22 makes it possible that the foregoing respiratory action in the electric power steering apparatus 10 is performed. Moreover, the second respiratory apparatus 22 is provided with the filter 22b having a water repellency; thus, even when water intrudes into the hollow protrusion portion 22a of the second respiratory apparatus 22, the water can be prevented from intruding into the control unit case 6a.

In order to reduce water, dust, and like as much as possible, it is desirable that the respiration opening of the second respiratory apparatus 22 is disposed at an uppermost position in the case wall portion 6b of the control unit case 6a. When the hollow protrusion portion 22a of the second respiratory apparatus 22 is formed to be long in the axis direction, intrusion of water, dust, or the like can further be reduced. In addition, when the second respiratory apparatus 22 is not provided in the case wall portion 6b but is disposed in the vicinity of the vertex portion of the cylindrical tubular outer circumferential surface of the control unit case 6a, it is made possible to make the second respiratory apparatus 22 situated at a further upper position. In addition, the respiration opening of the second respiratory apparatus may be disposed at a position that is upper in the vertical direction than the respiration opening of the first respiratory apparatus.

In the motor 7, for example, there exist a gap between the stator and the rotor and a gap between the outer circumferential surface of the stator and the inner circumferential surface of the motor housing 7a; in the inside of the control unit 6, a CPU (Central Processing Unit), various kinds of electric lines, an IC (Integrated Circuit), a driving circuit for driving the motor 7, and the like are mounted on a substrate, a relay member, a heat sink, and the like; among the substrate, the relay member, the heat sink, and the control unit case 6a, a great number of spaces exist. Accordingly, the foregoing gaps and spaces inside the electric power steering apparatus 10 function as a ventilation path in the electric power steering apparatus 10 that communicates with the first respiratory apparatus 15 and the second respiratory apparatus 22.

As described above, because the electric power steering apparatus according to Embodiment 1 is provided with the first respiratory apparatus and the second respiratory apparatus, as the control-unit-side respiratory apparatus, waterproofing measures are applied to the motor itself and the control unit itself; in addition, although waterproofing measures are applied to the coupling portion between the motor and the control unit, it is made possible to make the electric power steering apparatus maintain the respiratory function thereof. Moreover, in Embodiment 1, each of the first respiratory apparatus and the second respiratory apparatus has a filter having a water repellency; thus, the waterproofing function of the whole electric power steering apparatus can be secured. Moreover, the respective respiratory functions of the first respiratory apparatus and the second respiratory apparatus make it possible that the respective waterproofing functions based on the waterproofing measures applied to the motor itself and the control unit itself and based on the waterproofing measures applied to the coupling portion between the motor and the control unit are prevented from being deteriorated.

In the foregoing explanation, both of the first respiratory apparatus, as the motor-side respiratory apparatus, and the second respirator apparatus, as the control-unit-side respiratory apparatus, are provided; however, because even only any one of the respiratory apparatuses makes it possible to secure the respiratory function, it is allowed that only any one of the respiratory apparatuses is provided.

Because having a higher probability of being inundated with water than the second respiratory apparatus 22, it is desirable that the second respiratory apparatus 22 is disposed at a position upper than the position of the first respiratory apparatus 15.

Embodiment 2

Next, an electric power steering apparatus according to Embodiment 2 will be explained. The electric power steering apparatus according to Embodiment 2 is characterized by including the first respiratory apparatus, as a motor-side respiratory apparatus, and the second respiratory apparatus, as a control-unit-side respiratory apparatus, and characterized in that the respiratory function of the second respiratory apparatus is made higher than the respiratory function of the first respiratory apparatus. The other configurations and operational actions thereof are the same as those of the electric power steering apparatus according to Embodiment 1.

Comparison between the foregoing first respiratory apparatus 15 and the second respiratory apparatus 22 indicates that there exists a large difference between the respective external environments where the foregoing respiratory apparatuses are arranged. That is to say, the ventilation path communicating with the first respiratory apparatus 15 is connected with the outside from the inside of the electric power steering apparatus 10, by way of the gear unit 8 and the rack axle unit 2. In contrast, the ventilation path communicating with the second respiratory apparatus 22 expands from the inside of the electric power steering apparatus 10 toward the outer air; thus, the respiratory resistance and the pressure loss of the second respiratory apparatus 22 is smaller than those of the first respiratory apparatus 15. Accordingly, in comparison with raising the respiratory function of the first respiratory apparatus 15, it is easy to raise the respiratory function of the second respiratory apparatus 22.

Accordingly, in the electric power steering apparatus according to Embodiment 2, there has been taken measures for securely making the respiratory function of the second respiratory apparatus higher than the respiratory function of the first respiratory apparatus. The specific measure for raising the respiratory function of the second respiratory apparatus 22 can be obtained by making the air permeability of the water-repellent filter 22b of the second respiratory apparatus 22 higher than that of the water-repellent filter 15b of the first respiratory apparatus 15, by making the diameter of the water-repellent filter 22b of the second respiratory apparatus 22 larger than that of the water-repellent filter 15b of the first respiratory apparatus 15, by making the diameter of the penetration hole portion of the second respiratory apparatus 22 larger than that of the penetration hole portion of the first respiratory apparatus 15, or by combining some of the above measures.

Because the second respiratory apparatus 22 has a higher probability of being inundated with water than the first respiratory apparatus 15, it is desirable that the second respiratory apparatus 22 is disposed at a position upper than the position of the first respiratory apparatus 15.

As described above, the electric power steering apparatus according to Embodiment 2 includes the first respiratory apparatus, as a motor-side respiratory apparatus, and the second respiratory apparatus, as a control-unit-side respiratory apparatus, and the respiratory function of the second respiratory apparatus is made higher than the respiratory function of the first respiratory apparatus; therefore, it is made possible that the respiratory function of the electric power steering apparatus is secured and raised.

Embodiment 3

Figure 4:
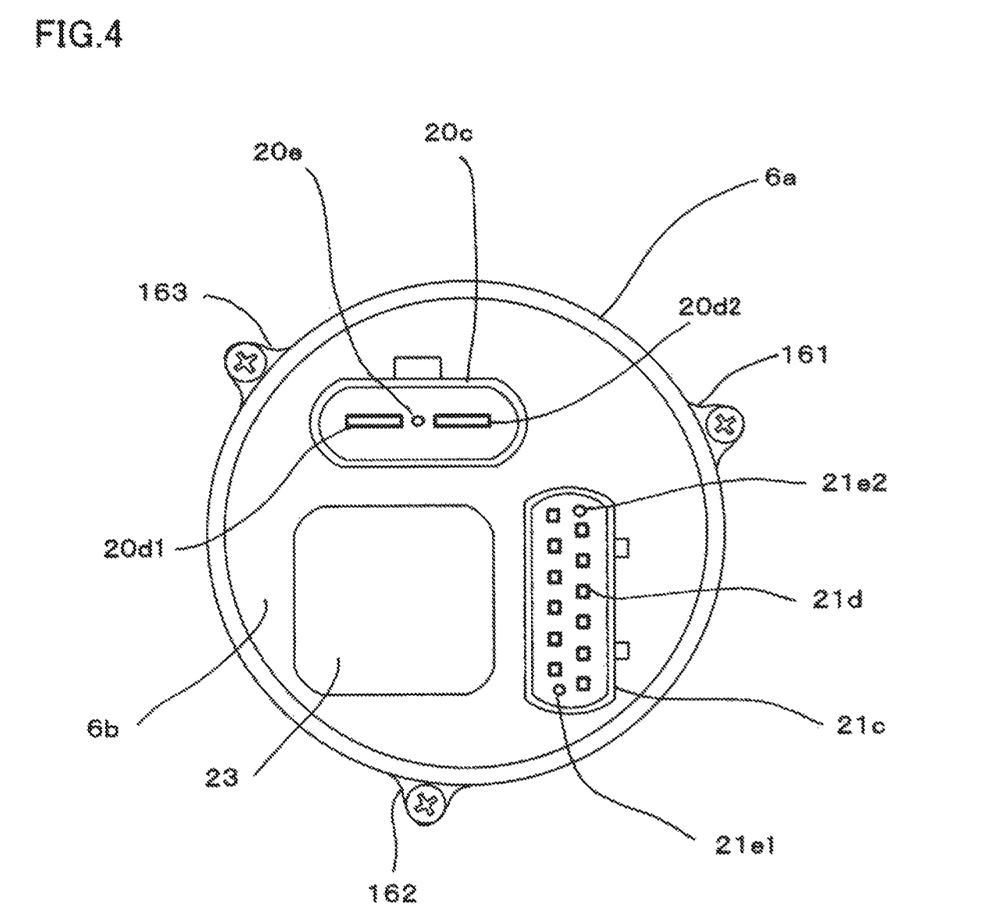
FIG. 4 is a plan view, at the control unit side, of the electric power steering apparatus according to Embodiment 3.

Next, an electric power steering apparatus according to Embodiment 3 will be explained. FIG. 4 is a plan view, at the control unit side, of the electric power steering apparatus according to Embodiment 3. In FIG. 4, each of a power source connecter 20c and a signal connector 21c is formed through outsert molding and a type having no completely waterproof structure. That is to say, a pair of power source connection terminals 20d in the power source connecter 20c and an insulating resin covering the peripheral surface thereof are integrated with each other through outsert molding; a great number of signal connection terminals 21d in the signal connector 21c and an insulating resin covering the peripheral surface thereof are integrated with each other through outsert molding.

The power source connecter 20c does not have a completely waterproof structure; thus, gaps exists between the pair of power source connection terminals 20d and the insulating resin covering the circumferential surfaces thereof. Moreover, the signal connector 21c does not have a completely waterproof structure; thus, gaps exist between the great number of signal connection terminals 21d and the insulating resin covering the circumferential surfaces thereof.

A ventilation hole 20e is provided between a pair of the power source connection terminals 20d1 and 20d2 and penetrates the power source connecter 20c and the case wall portion 6b of the control unit case 6a, so that the inside of the control unit case 6a, the inside of the motor housing 7a, and the outside of the power source connecter 20c communicate with one another.

A ventilation hole 21e1 is provided in the vicinity of the signal connection terminal, among the great number of signal connection terminals 21d of the signal connector 21c, that is situated at the lowermost position in the drawing; moreover, a ventilation hole 21e2 is provided in the vicinity of the signal connection terminal, among the great number of signal connection terminals 21d of the signal connector 21c, that is situated at the uppermost position in the drawing. Each of the ventilation holes 21e1 and 21e2 penetrates the signal connector 21c and the case wall portion 6b of the control unit case 6a, so that the inside of the control unit case 6a, the inside of the motor housing 7a, and the outside of the signal connector 21c communicate with one another.

When the vehicle-side power source connector 20a illustrated in FIG. 3B is connected with the power source connecter 20c, the connection portion between the vehicle-side power source connector 20a and the power source connecter 20c is covered with a waterproof cover (unillustrated), as a waterproofing measure; however, because the inside of the control unit case 6a and the inside of the motor housing 7a communicate with the outside by way of the ventilation hole 20e and the power source harness 20b, the electric power steering apparatus 10 can have a respiratory function. Moreover, because as described above, gaps exist between the pair of power source connection terminals 20d1 and 20d2 and the insulating resin covering the circumferential surfaces thereof, the inside of the control unit case 6a and the inside of the motor housing 7a communicate with the outside by way of the gap and the power source harness 20b; thus, although slightly, the electric power steering apparatus 10 can have a respiratory function.

When the vehicle-side signal connector 21a illustrated in FIG. 3B is connected with the signal connector 21c, the connection portion between the vehicle-side signal connector 21a and the signal connector 21c is covered with a waterproof cover (unillustrated), as a waterproofing measure; however, because the inside of the control unit case 6a and the inside of the motor housing 7a communicate with the outside by way of the ventilation holes 21e1 and 21e2 and the signal harness 21b, the electric power steering apparatus 10 can have a respiratory function. Moreover, because as described above, gaps exist between the great number of signal connection terminals 21d and the insulating resin covering the circumferential surfaces thereof, the inside of the control unit case 6aand the inside of the motor housing 7a communicate with the outside by way of the gaps and the signal harness 21b; thus, although slightly, the electric power steering apparatus 10 can have a respiratory function.

The electric power steering apparatus according to Embodiment 3 can be provided with a respiratory function based on the foregoing ventilation holes 20e, 21e1, and 21e2 and with a respiratory function based on the gaps around the power source connection terminals 20d1 and 20d2 and gaps around the signal connection terminals 21d; moreover, along these respiratory functions, air inside the control unit 6 and the motor 7 can be ventilated.

Although the present application is described above in terms of various exemplary embodiments and implementations, it should be understood that the various features, aspects and functions described in one or more of the individual embodiments are not limited in their applicability to the particular embodiment with which they are described, but instead can be applied, alone or in various combinations to one or more of the embodiments. Therefore, an infinite number of unexemplified variant examples are conceivable within the range of the technology disclosed in the present application. For example, there are included the case where at least one constituent element is modified, added, or omitted and the case where at least one constituent element is extracted and then combined with constituent elements of other embodiments.

INDUSTRIAL APPLICABILITY

An electric power steering apparatus according to the present application can be applied to the field of a vehicle such as an automobile.

DESCRIPTION OF REFERENCE NUMERALS

1: steering wheel
2: rack axle unit
3: torque sensor
4: pinion gear
5: vehicle wheel
6: control unit
6a: control unit case
6b: case wall portion
7: motor
7a: motor housing
7b: housing wall portion
8: gear unit
10: electric power steering apparatus
11: output axle
11a: output-axle gear
12: bearing
14: U-shaped groove
15: first respiratory apparatus
15a: penetration hole portion
15b, 22b: filter
20, 20c: power source connecter
20a: vehicle-side power source connector
20b: power source harness
20d1, 20d2: power source connection terminal
21, 21c: signal connector
21a: vehicle-side signal connector
21b: signal harness
21d: signal connection terminal
20e, 21e1, 21e2: ventilation hole
22: second respiratory apparatus
22a: hollow protrusion portion
23: electric component containing portion
101: steering shaft
131, 132, 133, 134: motor fixing portion
161, 162, 163: control unit fixing portion
171, 172: control-unit-fixing protrusion portion

The invention claimed is:

1. An electric power steering apparatus comprising:
a motor for generating auxiliary torque corresponding to steering torque exerted by a driver of a vehicle; and
a control unit for controlling the motor,
wherein the motor and the control unit are integrated with each other and the motor is mounted in the vehicle through the intermediary of a gear unit,
wherein the motor has a motor housing in which motor constituent members are contained, one axis-direction end portion of which is sealed, and the other axis-direction end portion of which is opened,
wherein the control unit has a control unit case in which control apparatus constituent members are contained, one axis-direction end portion of which is opened, and the other axis-direction end portion of which is sealed,
wherein the other axis-direction end portion of the motor housing and the one axis-direction end portion of the control unit case are coupled with each other while maintaining a waterproofing function,
wherein the one axis-direction end portion of the motor housing and the gear unit are coupled with each other while maintaining a waterproofing function, and
wherein the motor housing has a first respiratory apparatus that performs a respiratory action, based on an inner pressure change in the motor housing, the first respiratory apparatus being provided on the one axis-direction end portion of the motor housing.

2. The electric power steering apparatus according to claim 1, wherein a respiratory path of the respiratory apparatus is an inner space in each of the motor housing and the control unit case.

3. The electric power steering apparatus according to claim 2, wherein the respiratory apparatus has a waterproofing function.

4. The electric power steering apparatus according to claim 3, wherein the respiratory apparatus is provided only in the motor housing.

5. The electric power steering apparatus according to claim 3, further comprising a second respiratory apparatus provided in the control unit and performs a respiratory action based on an inner pressure change in the control unit.

6. The electric power steering apparatus according to claim 5, wherein the second respiratory apparatus is configured in such a way as to have a higher respiratory function than the first respiratory apparatus has.

7. The electric power steering apparatus according to claim 2, wherein the respiratory apparatus is provided only in the motor housing.

8. The electric power steering apparatus according to claim 2, further comprising a second respiratory apparatus provided in the control unit and performs a respiratory action based on an inner pressure change in the control unit.

9. The electric power steering apparatus according to claim 8, wherein the second respiratory apparatus is configured in such a way as to have a higher respiratory function than the first respiratory apparatus has.

10. The electric power steering apparatus according to claim 9, wherein a respiration opening of the second respiratory apparatus is disposed at a vertically higher position than a respiration opening of the first respiratory apparatus is.

11. The electric power steering apparatus according to claim 8, wherein a respiration opening of the second respiratory apparatus is disposed at a vertically higher position than a respiration opening of the first respiratory apparatus is.

12. The electric power steering apparatus according to claim 1, wherein the respiratory apparatus has a waterproofing function.

13. The electric power steering apparatus according to claim 12, wherein the respiratory apparatus is provided only in the motor housing.

14. The electric power steering apparatus according to claim 12, further comprising a second respiratory apparatus provided in the control unit and performs a respiratory action based on an inner pressure change in the control unit.

15. The electric power steering apparatus according to claim 14, wherein the second respiratory apparatus is configured in such a way as to have a higher respiratory function than the first respiratory apparatus has.

16. The electric power steering apparatus according to claim 1, wherein the respiratory apparatus is provided only in the motor housing.

17. The electric power steering apparatus according to claim 1, further comprising a second respiratory apparatus provided in the control unit and performs a respiratory action based on an inner pressure change in the control unit.

18. The electric power steering apparatus according to claim 17, wherein the second respiratory apparatus is configured in such a way as to have a higher respiratory function than the first respiratory apparatus has.

19. The electric power steering apparatus according to claim 17, wherein a respiration opening of the second respiratory apparatus is disposed at a vertically higher position than a respiration opening of the first respiratory apparatus is.

20. The electric power steering apparatus according to claim 18, wherein a respiration opening of the second respiratory apparatus is disposed at a vertically higher position than a respiration opening of the first respiratory apparatus is.

* * * * *